April 30, 1946.    H. V. RUDOLPH    2,399,297
FREQUENCY INDICATOR FOR VIBRATING REED TYPE ALTERNATORS
Filed Dec. 28, 1944    3 Sheets-Sheet 3

INVENTOR
Harold V. Rudolph.
BY
HIS ATTORNEY

Patented Apr. 30, 1946

2,399,297

UNITED STATES PATENT OFFICE 2,399,297

FREQUENCY INDICATOR FOR VIBRATING REED TYPE ALTERNATORS

Harold V. Rudolph, Wilkinsburg, Pa., assignor to The Union Switch & Signal Company, Swissvale, Pa., a corporation of Pennsylvania Application December 28, 1944, Serial No. 570,178

1 Claim. (Cl. 73—70)

My invention relates to a frequency indicator for vibrating reed type alternators.

As is well known, vibrating reed type alternators comprise a reed armature which is mechanically tuned to vibrate at a particular frequency, and which functions to operate contacts for supplying pulsating direct current to the primary winding of a transformer to produce alternating current of a desired frequency in the secondary winding of the transformer. In the operation of alternators of this type, the contacts gradually wear away, and this wear produces a very slow change, usually a decrease, in the frequency of the generated alternating current. For certain applications, such for example, as those found in railway signaling systems, wherein the alternators are used to supply 100 cycle alternating current for operating coded cab signals, it is desirable to remove the alternators from service for reconditioning when the frequency of the generated alternating current drops below a predetermined frequency, usually 95 cycles, and one object of my present invention is to provide a simple, inexpensive and reliable indicator which can be readily applied to an alternator of the type described, and which will visibly indicate when the reed frequency has decreased to the value at which the alternator should be reconditioned.

According to my invention, the indicator comprises a small reed which is mechanically tuned to vibrate at the desired frequency limit, and which is mounted on a small plate adapted to be secured in place on one of the terminal posts of the alternator. Associated with the reed is an adjustable slider to permit quick and accurate tuning of the reed to the desired frequency.

Other objects and characteristic features of my invention will become apparent as the description proceeds.

Figure 1:
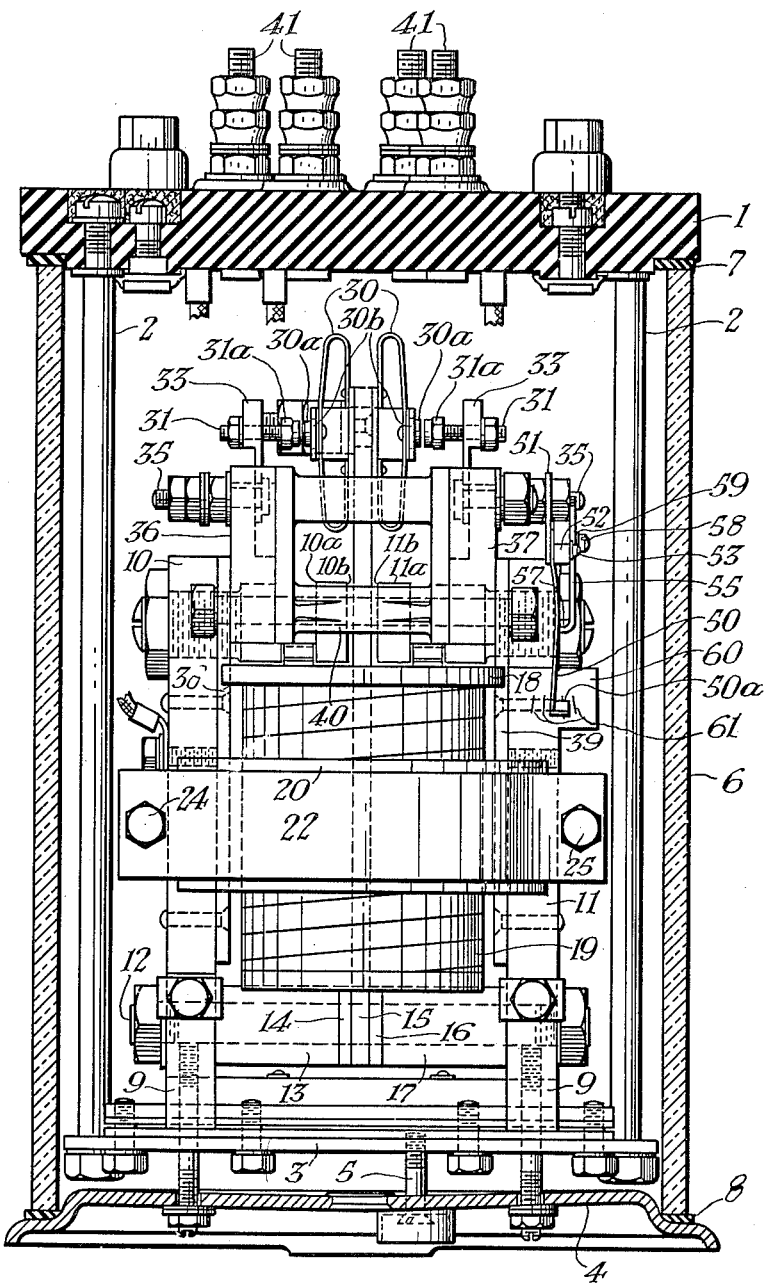
Figure 2:
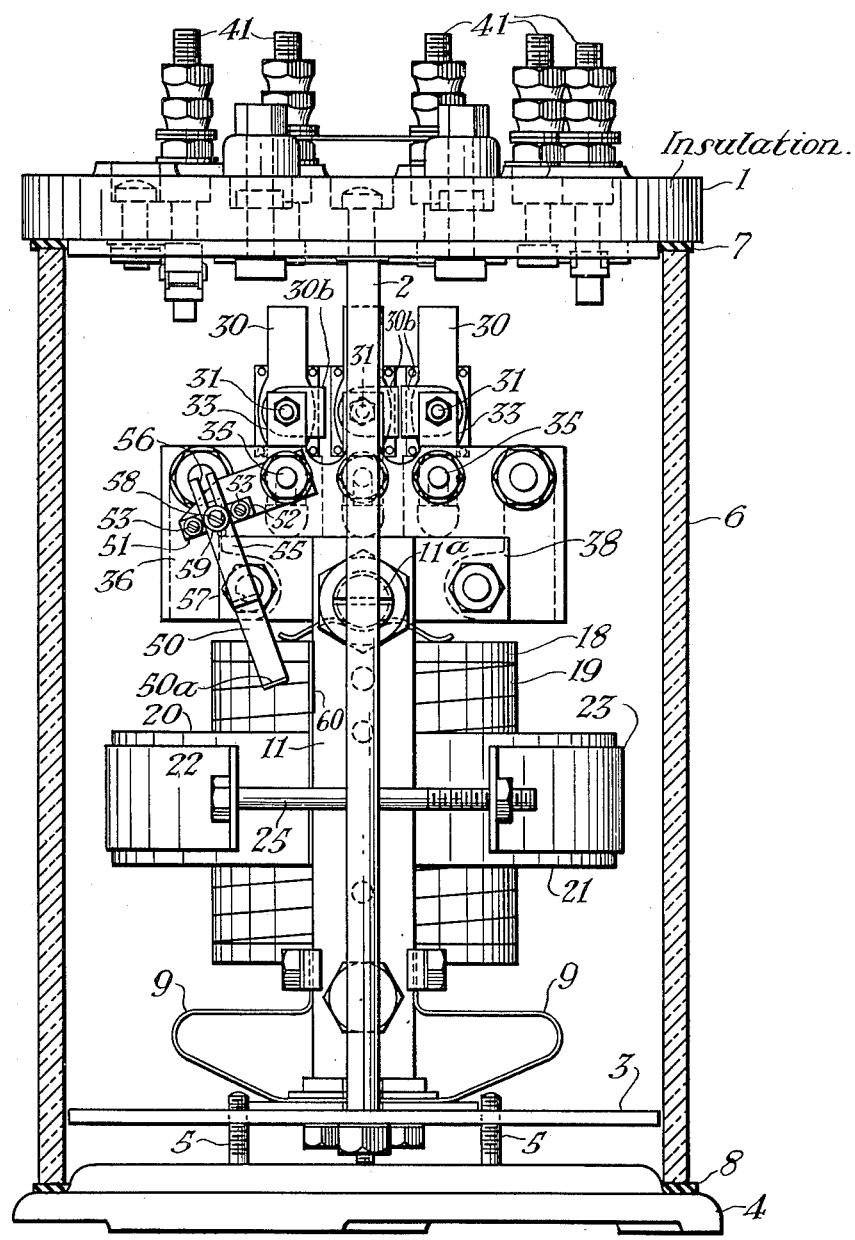
Figure 3:
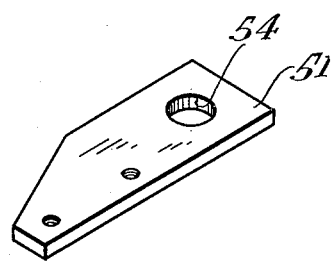
Figure 4:
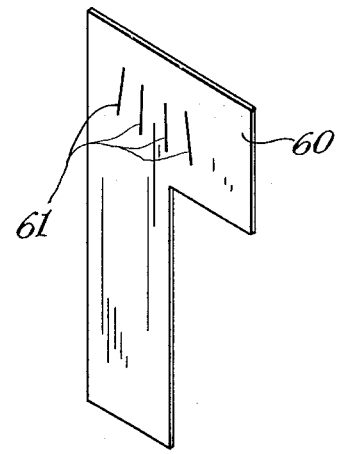
Figures 5, 6:
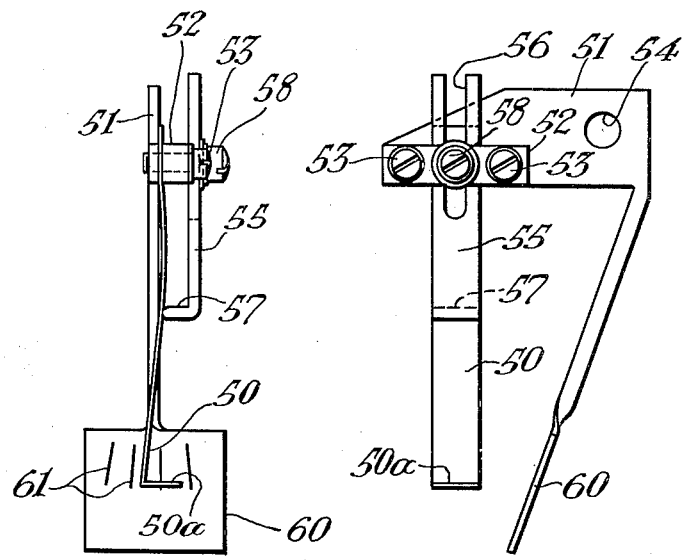

In the accompanying drawings, Fig. 1 is a front elevational view of one form of an alternator having applied thereto one form of frequency indicator embodying my invention, certain of the parts being shown in section to better illustrate the construction of the remaining parts. Fig. 2 is a side view of the alternator shown in Fig. 1. Figs. 3 and 4 are detail views of different parts of the indicator shown in Figs. 1 and 2. Figs. 5 and 6 are side and front views, respectively, of a modified form of indicator embodying my invention.

Similar reference characters refer to similar parts in each of the several views.

Referring to the drawings, the alternator to which I have shown my invention applied is of a well known type, and comprises a suitable case consisting of a top plate 1 of insulating material secured by means of spacing studs 2 to an intermediate mounting plate 3, a base plate 4 secured by means of screws 5 to the mounting plate 3, and a transparent glass cylinder 6 clamped between the top plate 1 and the base plate 4. A gasket 7 of cork or other suitable material is interposed between the top plate 1 and the upper end of the cylinder 6, and a similar gasket 8 is interposed between the bottom plate and the lower end of the cylinder, thereby sealing the case against the entry of dirt and other foreign substances.

The operating mechanism of the alternator is resiliently supported on the mounting plate 3 by means of two pairs of oppositely disposed springs 9, and comprises a core structure consisting of two laterally spaced magnetizable bars 10 and 11. The bars 10 and 11 are provided at their upper ends with adjustable pole pieces 10a and 11a, respectively, having confronting pole faces 10b and 11b, and clamped between the lower ends of these bars in the order named by means of a non-magnetic clamping bolt 12 are a magnetizable block 13, a non-magnetic spacing member 14, the lower end of a reed armature 15, a non-magnetic spacing member 16 and a magnetizable block 17. The reed armature 15 projects upwardly through a hollow spool 18 upon which the operating winding 19 of the relay is wound, and cooperates above the spool 18 with the pole pieces 10a and 11a.

Associated with the core structure are a pair of permanent magnets 20 and 21 each comprising a rectangular bar bent into a U-shape. These magnets are disposed directly opposite each other with their two legs engaging the opposite sides of the bars 10 and 11 approximately midway between the ends of the bars, and are clamped in place by means of two clamping strips 22 and 23 and two clamping bolts 24 and 25, respectively. The permanent magnets are arranged in such manner that their like poles are connected to the same bar, and are preferably made of "Alnico" because of its well known property of retaining a high degree of magnetic saturation over long periods of time.

The reed armature 15 is mechanically tuned to vibrate at a predetermined frequency, which for purposes of explanation I shall assume to be 100 cycles per second, and operates a plurality of contacts certain ones of which are used to control the energization of the winding 19 in a manner to cause the armature to vibrate at its natural period, and the remainder of which are used to supply periodically interrupted direct current from a suitable source to the primary winding of a suitable transformer not shown to cause alternating current of the frequency at which the reed vibrates to be generated in the secondary winding of the transformer. The contacts are all alike, and each comprises two cooperating contact buttons 30a and 31a secured respectively to a resilient supporting spring 30 and to an adjustable supporting post 31. The resilient supporting springs 30 are semi-elliptical in shape, and are riveted or otherwise secured in pairs to the opposite sides of the armature. Associated with each supporting spring is a C-shaped stop 30b provided with a hole through which the contact button on the associated spring extends with some clearance, and which stop cooperates with the spring to accurately position the contact button 30a relative to the armature when the contact comprising the contact button is open. The supporting posts 31 are adjustably mounted in the upper ends of contact arms 33, the lower ends of which are secured by means of associated terminal posts 35 within vertically disposed slots provided in insulating terminal boards 36 and 37. The terminal boards 36 and 37 are mounted on supporting brackets 38 and 39 secured to the inner sides of the vertical bars 10 and 11, and are rigidly held in a fixed parallel spaced relation by suitable spacing members 40 which are clamped between the terminal boards at their opposite ends. External connections to the various contacts and to the winding 19 are made by means of suitable terminal posts 41 which are mounted on the top plate 1, and which are connected to the contacts and to the winding through the medium of flexible connectors not shown.

With the alternator constructed as above described, it will be obvious that when it is energized, the reed armature 15 will vibrate at the frequency at which it is tuned to vibrate, and will thus alternately open and close the contacts 30a—31a.

Alternators of the type described are particularly suitable for, although in no way limited to, use in railway signaling systems of the type shown and described in Letters Patent of the United States No. 2,277,459, granted to Warren W. Seitz on March 24, 1942, wherein they are used to supply 100 cycle alternating current from a source of direct current for operating coded cab signals. In the operation of the alternator in such systems, the contacts gradually wear away, and as this wear takes place the frequency of the generated alternating current changes. The operating characteristics of the coded cab signaling equipment require that the frequency of the alternating current be maintained within certain limits, and in order to maintain these frequency limits it is desirable to be able to readily detect when the frequency of the reed armature has decreased to a predetermined low limit, such for example, as 95 cycles per second. For this purpose I provide the frequency indicator embodying my invention which frequency indicator I shall now describe.

As here shown, this frequency indicator comprises a reed 50 which is mechanically tuned to vibrate at the desired frequency limit, and which is clamped at one end to a mounting plate 51 by means of a clamping block 52 and two clamping screws 53. The clamping screws 53 pass through clearance holes in the clamping block, and are screwed into tapped holes provided in the mounting plate. The mounting plate may be secured to any part of the alternator which is subjected to sufficient vibration, in response to the vibration of the reed armature 15, to cause the reed to vibrate when the rate of vibration of the reed armature reaches the value to which the reed is tuned, but in order to enable the indicator to be readily applied to alternators which are already in service I prefer to mount the mounting plate on one of the terminal posts 35, preferably the left-hand terminal post as viewed in Fig. 2. To facilitate mounting the mounting plate on the mounting post, the mounting plate is provided with a hole 54 (see Fig. 3) for the reception of the terminal post. It will be seen therefore that in order to mount the indicator on an alternator it is only necessary to remove the outer nuts from the proper terminal post 35, slip the plate onto the terminal post in the desired position and replace the nuts. Associated with the reed is a slider 55 having a longitudinally extending slot 56 in one end, and provided at the other end with an inturned portion 57 bent at right angles to the main body portion of the slider. The slider is adjustably secured to the clamping block 52 by means of a screw 58 which passes through the slot 54 with some clearance and is screwed into a tapped hole in the clamping block 52. Interposed between the head of the screw 58 and the slider is a washer 59 which serves to distribute the screw pressure over a somewhat wider area of the slider. The slider is secured to the block in such position that the inturned portion of the slider will bear against the outer side of the vibrating reed, and it will be obvious that movement of the slider will vary the effective length of the reed, whereby the slider serves as a convenient means to vary the frequency at which the reed is tuned to vibrate. To insure that the reed will readily start to vibrate at the frequency for which it is tuned the lower end of the reed is provided with a portion 50a bent at right angles to the main body portion of the reed. This portion 50a adds mass to the reed without changing its stiffness.

While the vibration of the reed can be readily seen with the indicator constructed in the manner thus far descrbied, the amplitude of vibration can be more readily seen if a background plate 60 is provided. When the indicator is mounted in the position shown this background plate can be inserted between the one end of the magnet 20 and the magnetizable bar 11. If, however, it is desired to mount the indication elsewhere on the alternator the background plate may be formed integrally with the mounting plate as shown in Figs. 5 and 6.

In explaining the operation of the indicator as a whole, I shall assume that it is to be used on an alternator in which the reed armature normally vibrates at 100 cycles per second to generate 100 cycle alternating current under normal conditions, and that it is desired to have the indicator indicate when the reed armature frequency has decreased to 95 cycles so that the alternator can then be removed from service for reconditioning.

Under these conditions, the reed of the indicator is adjusted during the process of manufacture of the indicator to cause the reed to vibrate its maximum amplitude at 95 cycles per second. To effect this adjustment the reed 50 is first bent toward the right as viewed in Fig. 1, a sufficient amount to give it an initial set toward the slider, and the indicator is then mounted on a test alternator the reed frequency of which is tuned to vibrate at 95 cycles per second. The screw 58 is then loosened, and the slider 55 is moved up or down as required to cause the reed to vibrate through its maximum amplitude, whereupon the screw 58 is again tightened to clamp the slider in its adjusted position.

As long as the reed armature of the alternator on which the indicator is used vibrates at its intended frequency of 100 cycles, the reed of the indicator, if it vibrates at all, will vibrate at an extremely small amplitude. However, if the frequency of vibration of the reed armature decreases, the amplitude of vibration of the reed will increase, and when the reed armature frequency decreases to the desired limit frequency of 95 cycles, the reed will then vibrate at its maximum amplitude to thus provide a readily discernible indication that the alternator should be reconditioned. To facilitate detecting when the reed is vibrating its maximum amplitude suitable scale marks 61 may be provided in the background plate as shown.

One advantage of an indicator embodying my invention is that it makes it possible for the person charged with the maintenance of an alternator to readily detect at a glance, and without any necessity for any special meters such as the usual bulky frequency meter, when the alternators are in proper working condition, and when they are ready for reconditioning.

It should be particularly pointed out that while I have described an indicator embodying my invention as being applicable for indicating a low frequency limit, the reed can be tuned to give an indication when the reed armature is vibrating at any desired frequency. For example, it can be tuned to vibrate its maximum amplitude when the reed armature is vibrating at the normal frequency, and under these conditions, if the reed armature varies from this frequency, the indicator will stop thus indicating that the alternator is not delivering the desired frequency. Likewise, it can be tuned to vibrate its maximum amplitude at some frequency above the normal reed armature frequency to provide an upper frequency limit indication.

It should also be particularly pointed out that an indicator embodying my invention may be readily applied to alternators which are already in service, without necessitating any change in the construction of the alternator and without affecting its operation. Furthermore, since it is enclosed within the outer glass cover of the alternator, it is protected against damage due to handling and the like.

Although I have herein shown and described only two forms of frequency indicators embodying my invention, it is understood that various changes and modifications may be made therein within the scope of the appended claim without departing from the spirit and scope of my invention.

Having thus described my invention, what I claim is:

A frequency indicator comprising a mounting plate, a reed clamped at one end to said mounting plate by means of a clamping block and clamping screws, and a slider provided at one end with a longitudinally extending slot and adjustably secured to said mounting block by means of a screw passing through said slot, said slider being provided at the other end with a portion extending toward and engaging said reed and said reed being provided with an initial set toward said slider and with a portion at its free end bent at an angle to the main body of the reed to assist in initiating vibration of the reed, said slider serving as a means to adjust the frequency at which the reed will vibrate.

HAROLD V. RUDOLPH.